United States Patent [19]

Rader et al.

[11] 4,134,318
[45] Jan. 16, 1979

[54] GRID STACKING ARRANGEMENT FOR A BATTERY GRID CASTING MACHINE

[75] Inventors: Robert R. Rader, Port Huron, Mich.; Ray Schenk, Inverness, Ill.

[73] Assignee: Wirtz Manufacturing Company, Inc., Port Huron, Mich. ; a part interest

[21] Appl. No.: 807,293

[22] Filed: Jun. 16, 1977

[51] Int. Cl.² .................... H01M 35/08; B26D 7/06
[52] U.S. Cl. .......................................... 83/91; 83/94; 83/96; 83/903; 214/6 C; 29/2; 83/23
[58] Field of Search ............... 83/903, 94, 91, 90, 83/96, 78, 23; 214/6 C; 29/2

[56] References Cited

U.S. PATENT DOCUMENTS

| | | | |
|---|---|---|---|
| 1,870,207 | 8/1932 | Washburne | 214/6 C |
| 2,253,280 | 8/1941 | Lormor | 83/903 X |
| 3,080,070 | 3/1963 | Euwe | 214/6 C |
| 3,623,504 | 11/1971 | Goodwin | 83/903 X |
| 3,803,676 | 4/1974 | Radar | 83/903 |

*Primary Examiner*—Donald R. Schran
*Attorney, Agent, or Firm*—Barnes, Kisselle, Raisch & Choate

[57] ABSTRACT

A mechanism is provided in a battery grid casting machine for receiving grids one at a time from a grid trimming die and for arranging them in a horizontally stacked arrangement on a pair of pivoted rails. After a predetermined number of grids have accumulated on the rails, the rails are pivoted from a horizontal to a vertical position to deposit the grids as a vertical stack on an intermittently moving conveyor.

6 Claims, 10 Drawing Figures

GRID STACKING ARRANGEMENT FOR A BATTERY GRID CASTING MACHINE

This invention relates to a battery grid casting machine, and more particularly to a grid stacking mechanism on such machine.

In a conventional battery grid casting machine the cast grids are ejected from the battery grid mold onto a conveyor or other mechanism which transfers the grids one at a time to a grid trimming die. A second conveyor mechanism receives the grids from the grid trimming die and stacks them horizontally on a pair of support rails or the like which normally engage the undersides of laterally outwardly extending lugs at the opposite side edges of the grids. The grids are then normally manually removed periodically from the rails on which they are stacked and delivered either to a storage rack or directly to a grid paste machine. In either event, at some point in their handling, after being trimmed, the grids are manually re-oriented from a horizontally stacked arrangement to a vertically stacked arrangement.

The present invention has for its object the provision of a battery grid casting machine which includes a mechanism for automatically arranging the grids in vertical stacks of predetermined height or number in a continuous manner after they are trimmed.

More specifically, the present invention is directed to a mechanism for stacking grids vertically after they have been trimmed and periodically depositing a vertical stack of grids onto a conveyor which advances the stacks to a discharge point from which they may be transferred to storage racks or directly to a grid paste machine.

Other objects, features and advantages of the present invention will become apparent from the following description and accompanying drawings, in which:

Figure 1:
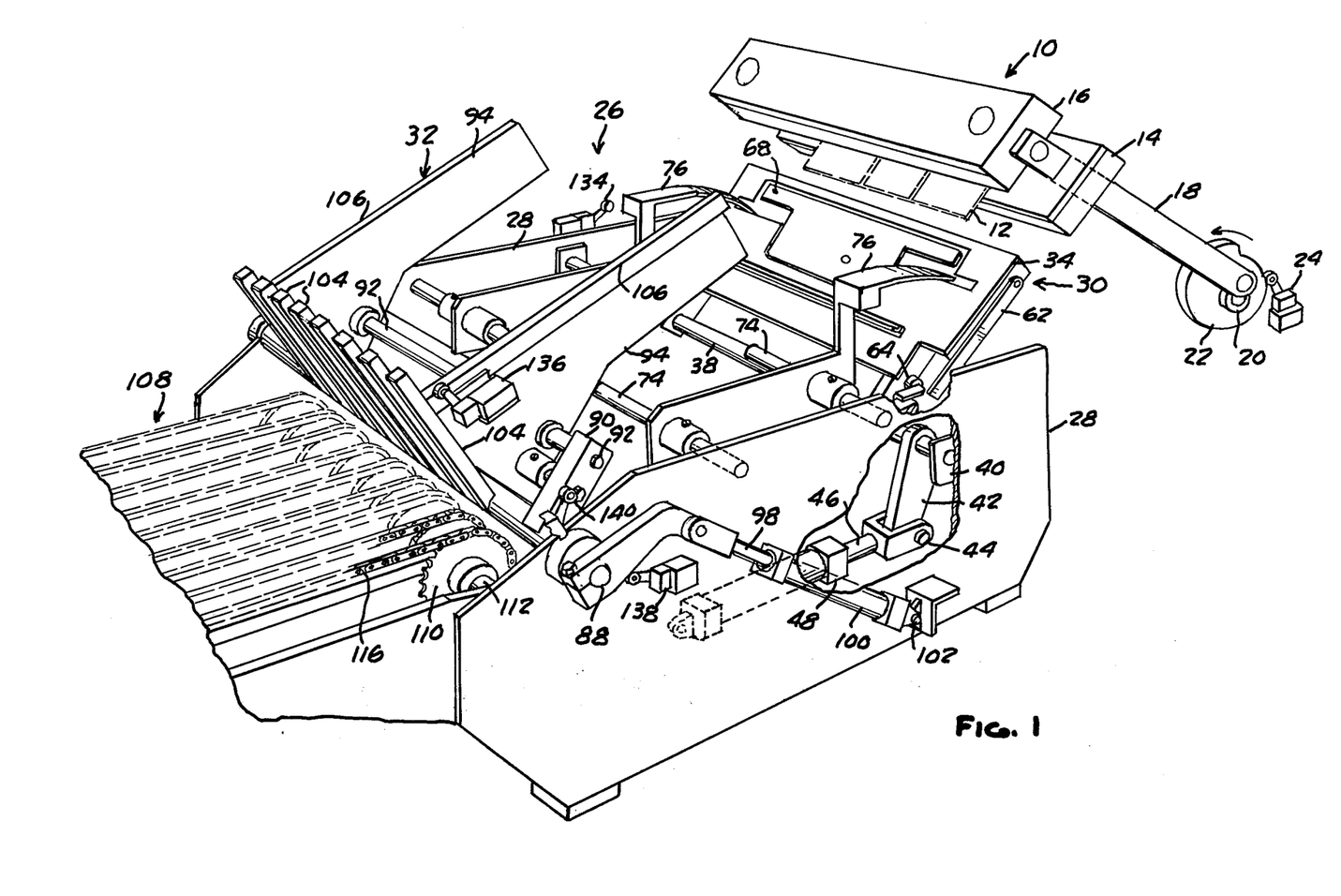
FIG. 1 is a fragmentary perspective view of a battery grid casting machine illustrating the present invention.

Referring first to FIG. 1, there is illustrated a battery grid casting machine which includes a grid trimming mechanism 10 which is more or less conventional on battery grid casting machines. The grids generally designated 12, after being cast, are fed one at a time to the trimming mechanism which may comprise a lower die 14 and an upper die 16 which is reciprocated by means of link 18 attached to a crankshaft 20 rotated at a predetermined speed in synchronism with other mechanisms on the machine. A cam 22 fixed to shaft 20 is adapted to periodically actuate an electrical switch 24.

Figures 2, 3:
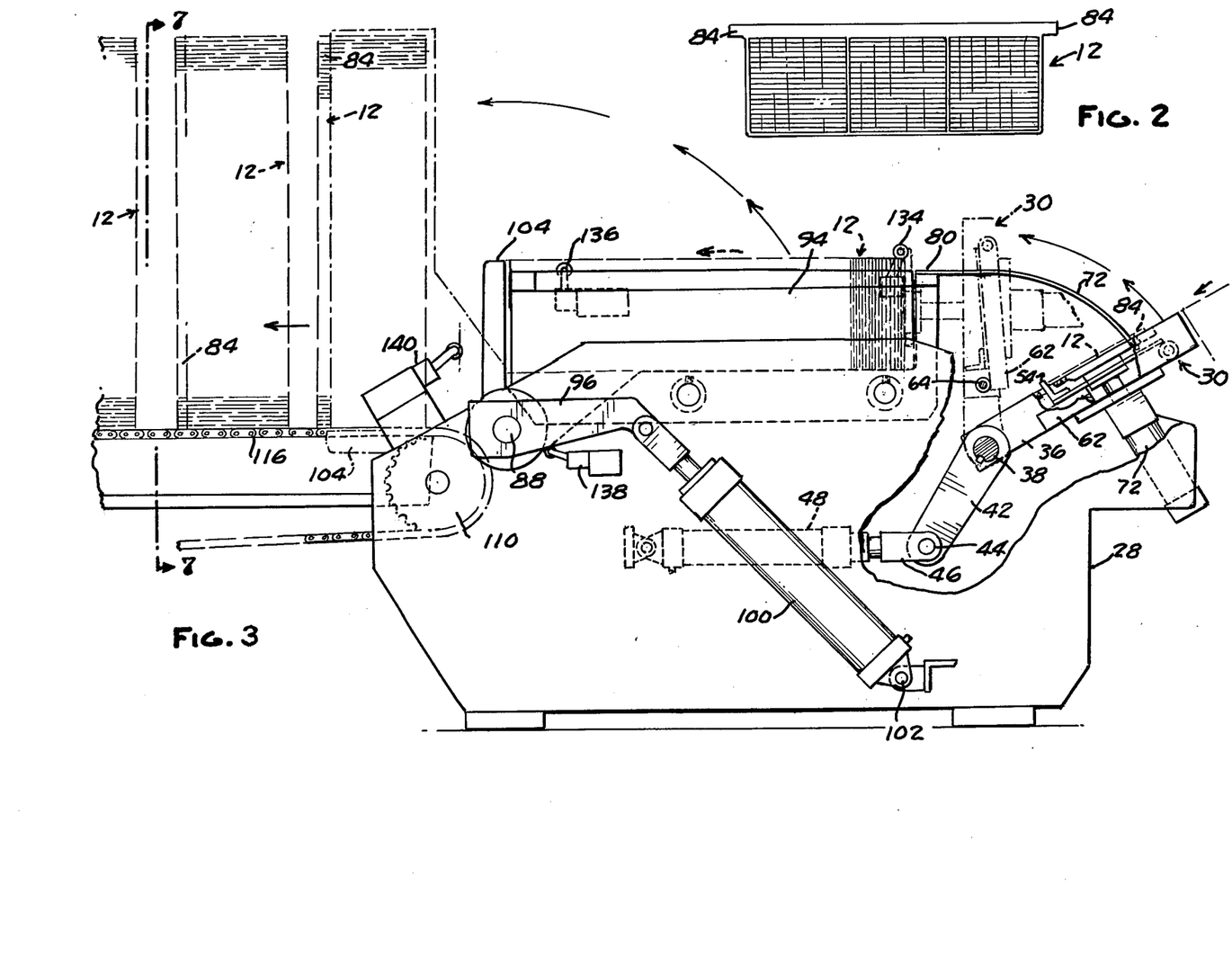
FIG. 2 is a view showing the general shape of cast battery grids with which the invention relates.
FIG. 3 is a fragmentary side elevational view, with parts broken away, of the portions of the machine embodying the invention.
Figures 4, 5:
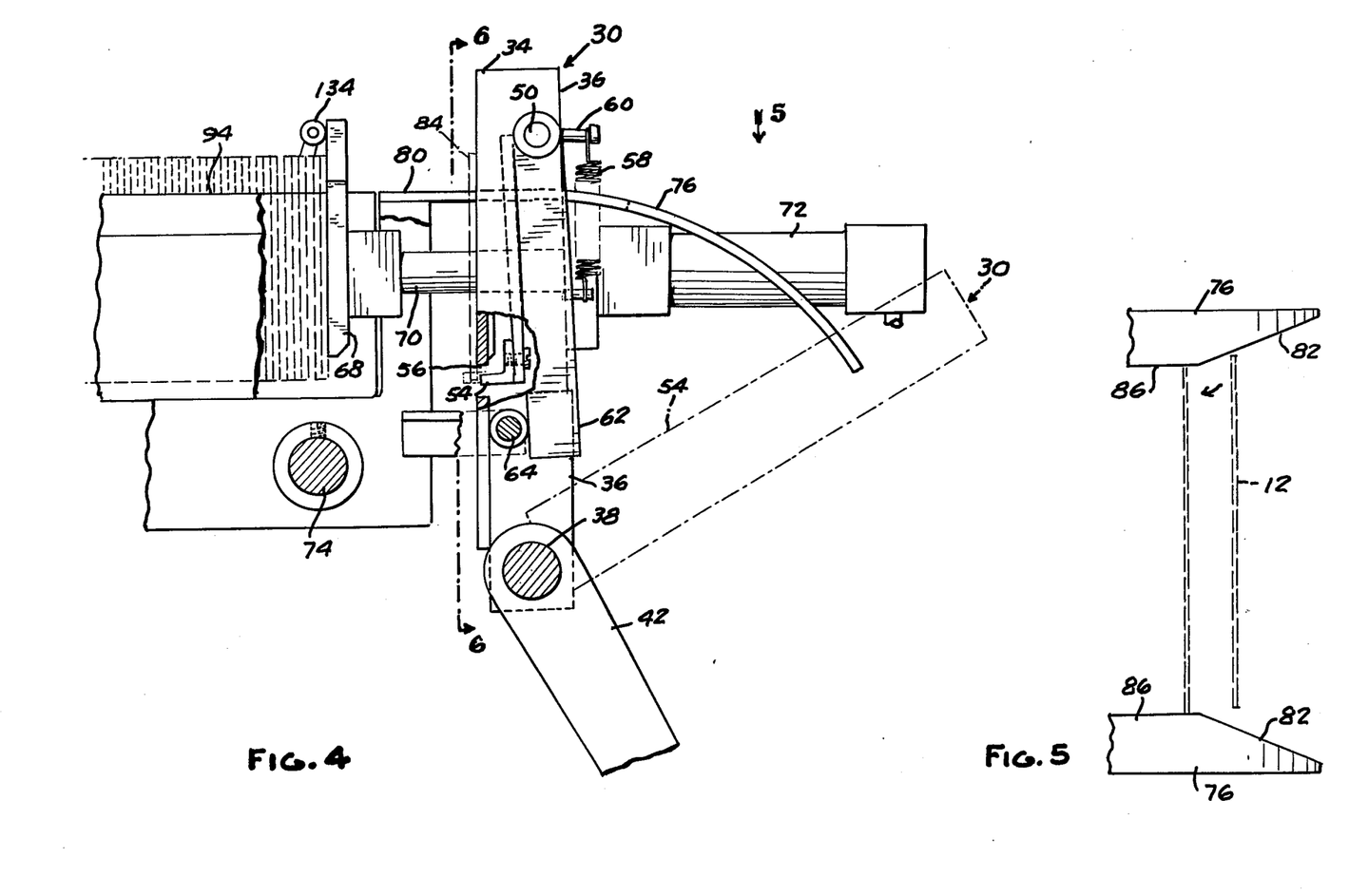
FIG. 4 is a fragmentary side elevational view of a portion of the machine shown in FIG. 3 on a larger scale.
FIG. 5 is a fragmentary top view of a portion of the machine as viewed along the line of arrow 5 in FIG. 4.

The grid stacking mechanism of the present invention is generally designated 26 in FIG. 1 and includes a base frame having a pair of stationary side plates 28. Stacker mechanism 26 generally includes a grid stacker assembly 30 and a rail assembly 32. Referring now to FIGS. 3 and 4, the grid stacker assembly 30 includes a stacker plate 34 mounted upon a pair of arms 36 fixedly attached to a shaft 38. Shaft 38 is journalled at each end in bearings 40 mounted on the side plates 28. Adjacent one end an arm 42 is keyed to shaft 38. The end of arm 42 is pivotally connected, as at 44, to the outer end of a piston rod 46 of a fluid cylinder 48. When cylinder 48 is actuated, stacker plate assembly 30 is pivoted between the broken line and the solid line positions shown in FIG. 4.

Figure 6:
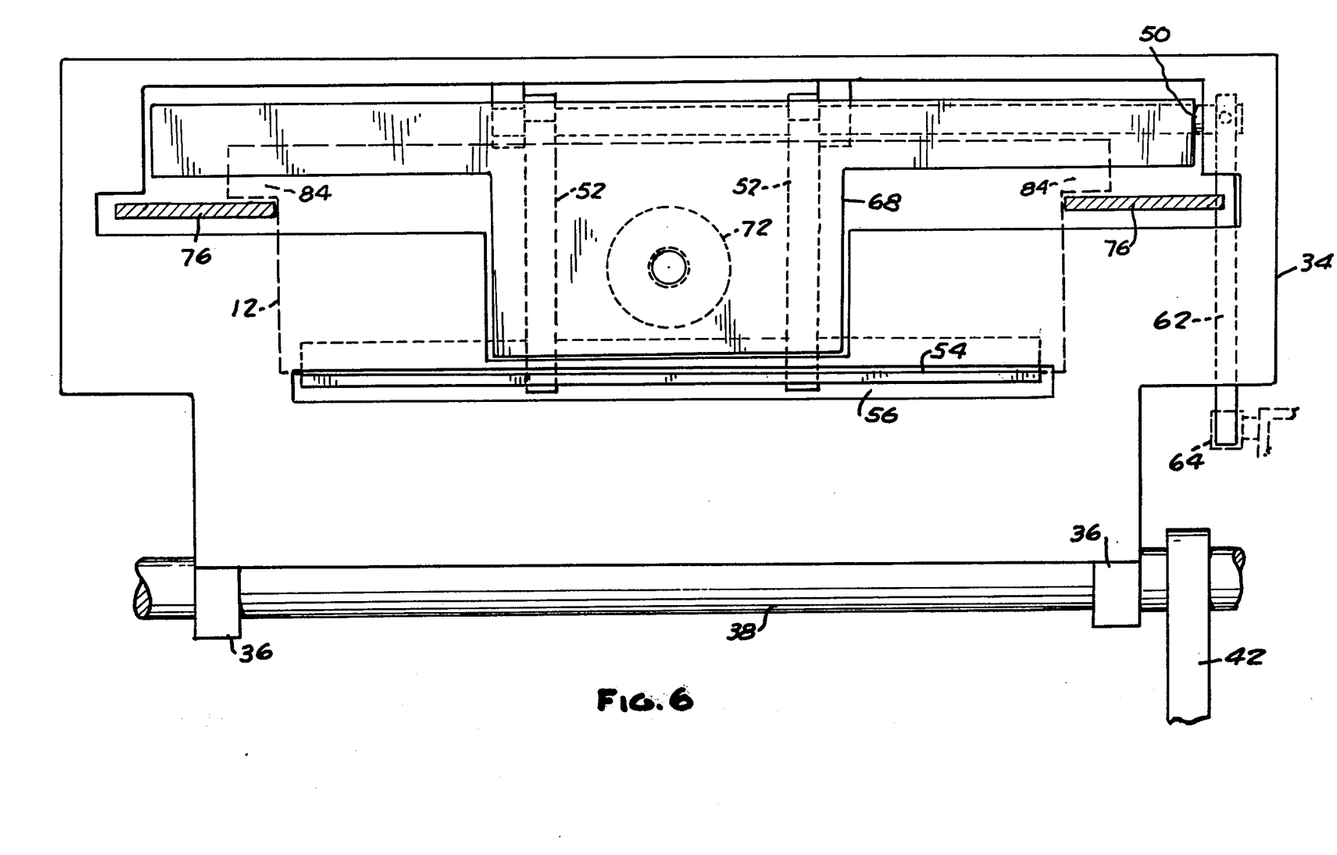
FIG. 6 is a sectional view along the line 6—6 in FIG. 4.

On the under or rear side of stacker plate 34 there is journalled a shaft 50 on which is fixed a pair of depending arms 52 (FIGS. 4 and 6). An angle iron 54 is secured to the lower ends of arms 52. One leg of the angle iron normally projects forwardly or upwardly through a slot 56 in stacker plate 34. The angle iron is biased to this position by means of a spring 58 anchored to a stud 60 on shaft 50. At one end of shaft 50 there is keyed or otherwise fixed thereto a depending arm 62 (FIG. 6) which, when the stacker plate is pivoted to the upright position shown in solid lines in FIG. 4, contacts a stop roller 64 on the adjacent side plate 28 to pivot shaft 50 in a counterclockwise direction as viewed in FIG. 4. This causes the leg of the angle iron 54 to be retracted through slot 56 in stacker plate 34.

The generally central portion of stacker plate 34 is formed with a generally T-shaped opening 66 in which is located a correspondingly shaped pusher plate 68. Pusher plate 68 is attached to the forward end of a piston rod 70 associated with a fluid cylinder 72 mounted on the rear side of stacker plate 34. Pusher plate 68 and cylinder 72 are adapted to rotate with stacker plate 34.

Rail assembly 26 includes a pair of parallel shafts 74 extending transversely between and mounted at their ends on side plates 28. A pair of arcuate rails 76 are slideably mounted on shafts 74 for adjustment toward and away from each other. The curved lower ends 78 of rails 76 extend through portions of the opening 66 in stacker plate 34. The upper ends 80 of rails 76 extend horizontally forwardly of stacker plate 34 when the latter is in the vertical position illustrated in FIG. 4. When stacker plate 34 is in the inclined position shown in FIGS. 1 and 2 a grid 12 released from the trim die 10 slides downwardly onto stacker plate 34 and is supported thereon along its lower edge by the angle iron 54. As the stacker plate is pivoted to the upward position the curved or tapered lower edges 82 (FIG. 5) on the arcuate rails 76 engage the side edges of the grid below the laterally outward projections 84 thereon and guide the grid as it is tilted upwardly so that its side edges are aligned with the straight inner edges 86 of the upper end portions 80 of rails 76. When stacker plate 34 assumes the vertical position shown in FIG. 4, the angle iron 54 is retracted and the grid is supported on the horizontally extending portions 80 of the rail 76 by means of lugs 84 on the grid.

Adjacent the opposite ends of side plates 28 there is journalled thereon another transversely extending shaft 88 on which there is fixed a pair of arms 90. Parallel shafts 92 extend transversely between arms 90. A pair of parallel rails 94 are mounted on shafts 92 for adjustment toward and away from each other. The spacing between rails 94 and between rails 76 is adjusted to the width of the grid being cast. Rails 94 are adjusted so that the inner edges thereof are generally longitudinally aligned with the inner straight edges 86 on rails 76. At one end shaft 88 has a crank 96 fixed thereto. The end of crank 96 is connected to a piston rod 98 of a fluid cylinder 100 which is pivotably supported as at 102. There is also fixedly mounted on shaft 88 a plurality of transversely spaced parallel fingers 104 which lie in a plane generally perpendicular to the plane of the upper edges 106 of rails 94. When cylinder 100 is actuated, rails 94 and fingers 104 are pivoted between the solid line and the broken line positions shown in FIG. 3.

Figure 7:
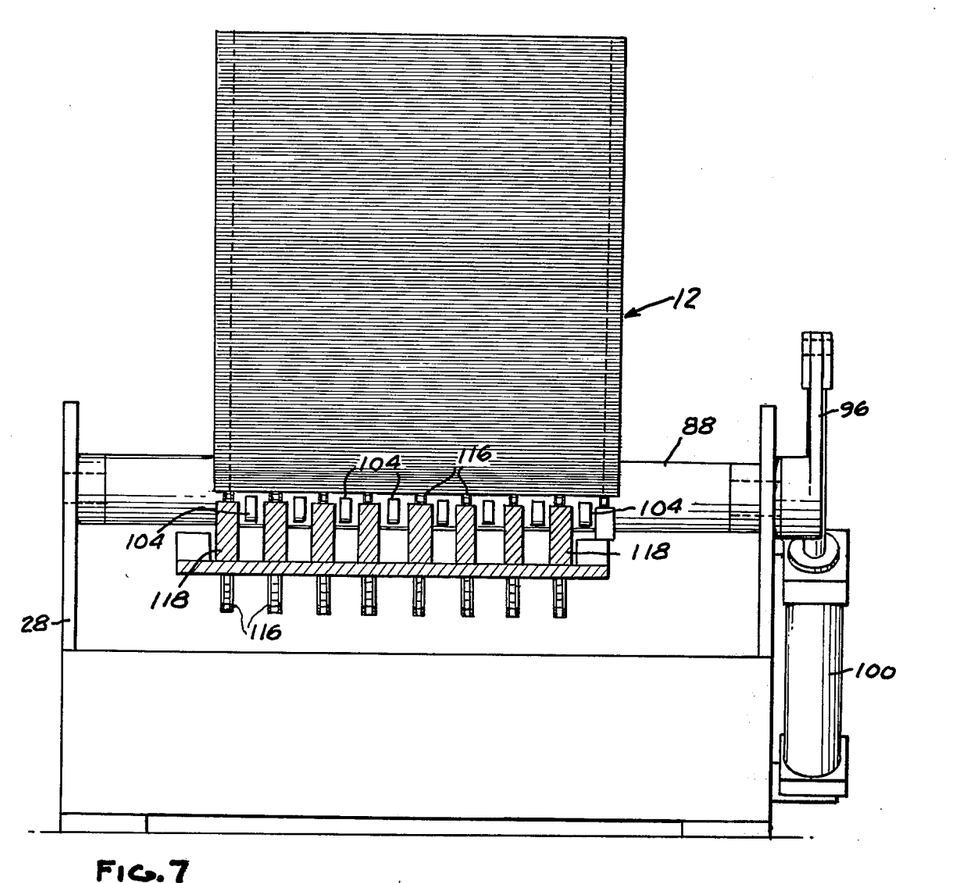
FIG. 7 is a sectional view along the line 7—7 in FIG. 3.
Figures 8, 9:
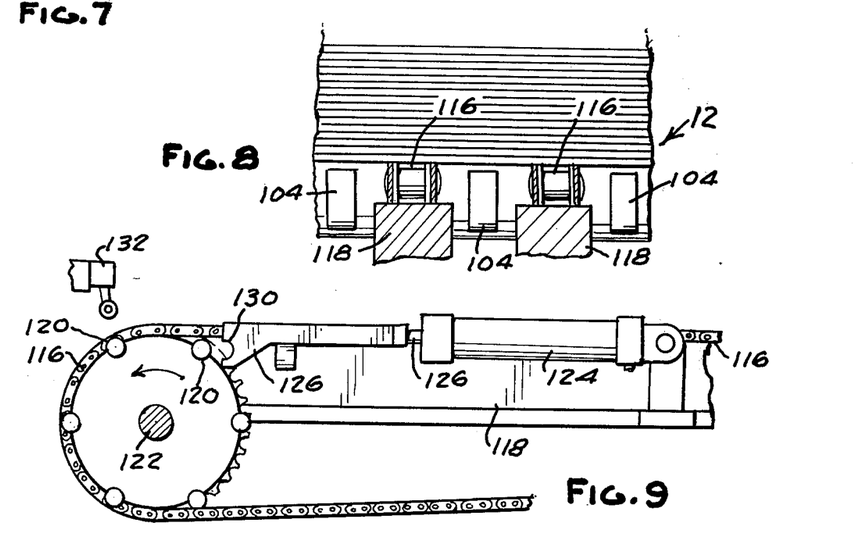
FIG. 8 is an enlarged view of a portion of FIG. 7.
FIG. 9 is a somewhat diagrammatic side elevation of a portion of the machine conveyor.

Adjacent shaft 88 there is arranged a chain conveyor generally designated 108. The upstream end of conveyor 108 comprises a plurality of sprockets 110 fixed on a shaft 112. The opposite or downstream end of conveyor 108 (FIG. 9) also comprises a plurality of sprockets 114, the spacing of which corresponds with the spacing of sprockets 110. Chains 116 are trained around both sets of sprockets. The chains are vertically supported by upright guide bars 118 (FIGS. 7 and 8). As shown in FIG. 8, the spacing of sprockets 110 is such that, when the fingers 104 are pivoted to the horizontal position shown in broken lines in FIG. 3, they move downwardly between chains 116 and sprockets 110 to a position where they are disposed slightly below the upper edges of the chains.

Referring again to FIG. 9, there is illustrated one form of means for moving the conveyor at the downstream end thereof with a step motion through a predetermined distance. The means illustrated includes a plurality of pins 120 mounted in circumferentially spaced relation around one of the sprockets 114 or on a separate plate fixed to shaft 122 to which the sprockets are keyed. A fluid cylinder 124 has a piston rod 126 having a head 128 fixed to the outer end thereof. Head 128 is fashioned with a socket 130 which, when piston rod 126 is projected, is adapted to engage the adjacent pin 120 and thereby rotate shaft 122 and all the sprockets thereon through a predetermined distance. Upon the full stroke of piston rod 126 head 128 trips a limit switch 132. In this way each of the chains 116 are advanced through a predetermined distance.

Referring again to FIG. 1, the mechanism includes additional limit switches 134,136,138,140. Limit switch 134 is tripped by pusher plate 68 after pusher plate cylinder 72 has been actuated through its full stroke. Limit switch 136 is tripped by the forwardmost grid of the horizontal stack of grids which accumulates on rails 94. Limit switch 138 is tripped by arm 96 when rails 94 are pivoted downwardly to the horizontal position. Limit switch 140 is tripped by arm 96 when rails 94 are pivoted to the upright position shown in broken lines in FIG. 3.

In operation the grids 12 are discharged from the trim die 10 one at a time onto stacker plate 34. As the grids are successively deposited on stacker plate 34 switch 24 is tripped intermittently to actuate cylinder 48 and thus pivot the stacker plate from the inclined position shown in FIGS. 1 and 3 to the upright position shown in FIG. 4. Thus, the grids are successively transferred to the horizontal portions 80 of the arcuate rails 76. As the grids stack up in a horizontal fashion on the horizontal portions 80 of rails 76, each successive grid advances the whole stack of grids the thickness of one grid. Thus, the grids accumulate as a horizontal stack on rails 94 and the upper ends 80 of rails 76.

After a predetermined number of grids have accumulated on these rails, for example, to a length of 20 inches, the forwardmost grid trips switch 136 which, as hereinafter explained, actuates pusher cylinder 72 which advances the entire stack of grids forwardly on rails 106, through a distance of 3 inches, for example, to a position wherein the forwardmost grid is located closely adjacent the fingers 104, as shown in FIG. 3. The rearmost grid is now located on rails 94. As the pusher cylinder 107 completes its stroke, it trips switch 134 which causes the pusher plate 68 to retract and actuate cylinder 100 to pivot rails 94 upwardly to the upright position. The pivotal movement of rails 94 is somewhat slower than the retraction movement of pusher plate 68 and, thus, there is no interference between these members.

When rails 94 assume the upright position shown in broken lines in FIG. 3, fingers 104 are located at a level below chains 116 and the stack of grids of predetermined height is therefore deposited on the conveyor chains 116. At this instant switch 140 is tripped which actuates conveyor cylinder 124 (FIG. 9) to advance chains 116 a distance such that the trailing side of the stack of grids on the chains clears the outer ends of fingers 104. When the conveyor cylinder 124 completes its forward stroke, head 128 trips switch 132 which again actuates cylinder 100 to return rails 94 to their normal horizontal position shown in FIG. 2. In the meantime, stacker plate 34 has pivoted back to the inclined position where it is ready to receive another grid from the trim die.

Figure 10:
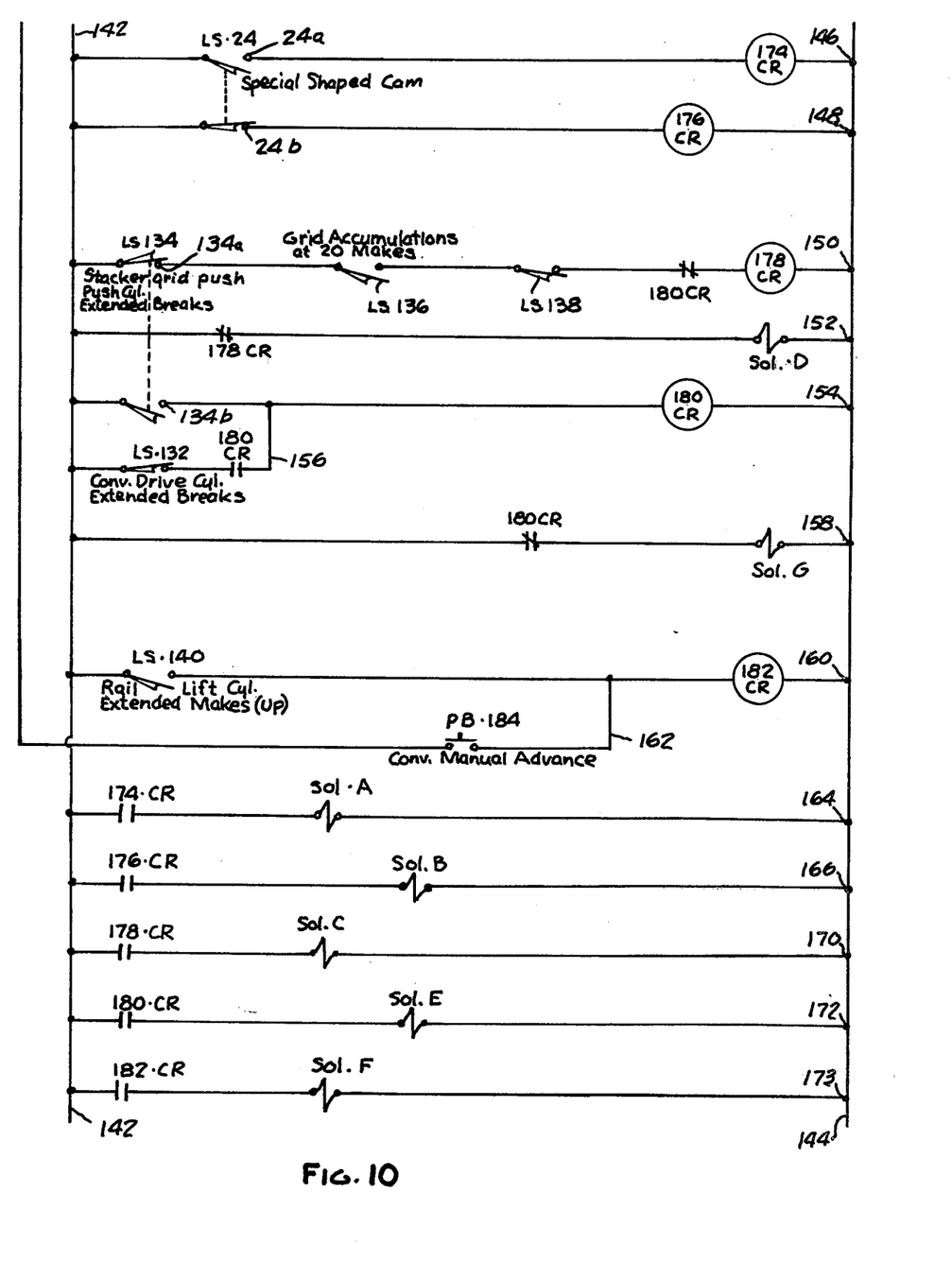
FIG. 10 shows a portion of the electrical wiring arrangement of the portion of the machine to which the invention relates.

The electrical arrangement for performing the previously described sequence of operations is illustrated diagrammatically in FIG. 10. In this diagram the conductors for supplying electrical power are designated 142,144. The junctions between the various electrical components and the power conductors 142,144 are designated, for simplicity, at lines 146 through 173. As shown in FIG. 10, limit switch 24 is a two-position switch having a pair of contacts 24a at line 146 and a second pair of contacts 24b at line 148. When one set of these contacts is closed by cam 22 the other pair of contacts is opened. When the contacts 24a are closed by the high side of cam 22 (after die 10 has opened), the coil of a relay 174CR (line 146) is energized. This relay closes a pair of open contacts 174CR at line 164 which energizes solenoid valve A which actuates cylinder 48 to thereby pivot stacker plate 34 from the inclined to the upright position and thus transfer the successive grids onto rails 106. It is understood, of course, that as cam 22 rotates slowly, after a predetermined time interval switch 24 is actuated by the low side of the cam to close contacts 24b at line 148 and thus energize the coil of relay 176CR (line 148). When relay 176CR is energized it closes a pair of contacts 176CR at line 166 to energize solenoid valve B which directs fluid to the other end of cylinder 48 and thereby returns stacker plate 34 to the inclined position for receiving the next grid.

After a predetermined number of grids have accumulated on rails 94, the forwardmost grid trips switch 136. This closes a circuit to relay 178CR at line 150 through normally closed contacts 180CR and limit switch 138 which is closed since rails 94 are in the lowered position. Relay 178CR, when energized, closes a pair of contacts 178CR at line 170 to solenoid valve C which directs fluid to pusher plate cylinder 72 to thereby project the pusher plate 68 forwardly and advance the horizontally stacked grids on rails 94 to a position wherein the forwardmost grid is located directly adjacent the upright fingers 104 and the rearmost grid is shifted from rails 76 to rails 94, as shown in FIG. 2. When the pusher plate 68 has advanced through its full stroke, it trips switch 134 which, as shown in FIG. 10, has one set of normally closed contacts 134a at line 150 and another set of normally opened contacts 134b at line 154. When switch 134 is tripped relay 178CR at line 150 is deenergized and the normally closed contacts 178CR at line 152 energize solenoid valve D which directs fluid to pusher plate cylinder 72 to retract the pusher plate. However, at the same time that relay 178CR is deenergized, the contacts 134b at line 154 energize a latching relay 180CR. The energizing of relay 180CR opens the normally closed contacts 180CR at line 150 and thereby prevents relay 178CR from being re-energized when the pusher plate 68 is retracted. At the same time, when relay 180CR is energized the normally opened contacts 180CR at line 172 are closed to energize solenoid valve E which supplies fluid to cylinder 100 so as to pivot rails 94 from the horizontal to the vertical position.

When the stack of grids is deposited on the conveyor chains 116 by the pivoted rail assembly 32, switch 140 is tripped, closing a circuit to relay 182CR at line 160 which in turn closes the normally opened contacts 182CR at line 173 to energize solenoid valve F which supplies fluid to conveyor index cylinder 124. Thus, the stack of grids on the conveyor is advanced a predetermined distance which clears the landing zone for the retraction of fingers 104.

When the conveyor index cylinder 124 completes its forward stroke it actuates limit switch 132 at line 156. The electrical holding circuit for relay 180CR is broken to de-energize the relay and to again close the contacts 180CR at line 158. This energizes solenoid valve G which directs fluid to cylinder 100 so as to lower rails 94 to the horizontal position where another stack of grids can be accumulated thereon.

A push button 184 at line 162 is used to manually advance the conveyor whenever it is desired to unload the conveyor before a stack of grids reach the downstream end thereof. The valve for powering the conveyor index cylinder 124 is a single solenoid valve F at line 173 with a spring return.

In the above described sequence of operations it will be appreciated that the rotation of cam 22 is such as to provide sufficient time for the quick acting pusher plate cylinder 72 to advance and retract the pusher plate 68 as described before the stacker plate 34 is returned to its inclined grid receiving position. However, it will be noted that the horizontal portions 80 of rails 76 extend forwardly substantially beyond the stacker plate 34 when the latter is in the upright position to allow several grids to accumulate thereon. Thus, the stacker plate can execute several strokes while the lift rails 94 are being raised to stack the grids on the conveyor and then lowered again to the horizontal position to receive the grids which have accumulated in the meantime on the straight portions 80 of rails 76.

We claim:

1. In a battery grid casting machine the combination comprising, a die for trimming a cast grid to the desired shape and size, the grid being of the type having a pair of lugs thereon projecting one from each side thereof by means of which the grids are adapted to be suspended from a pair of laterally spaced rails, a grid stacker assembly on said machine adapted to receive the grids one at a time from the trim die, said stacker assembly having a grid stacker plate thereon which is supported for movement in an arcuate path from a grid receiving position wherein the stacker plate is inclined to the vertical to a grid delivery position wherein the stacker plate and the grid thereon are disposed generally vertically, a rail assembly on said machine comprising first and second rail sections disposed in end to end relation, the first rail section comprising a pair of tranversely spaced rails fixedly mounted on the machine and having an arcuate portion generally coextensive with the arcuate path of travel of the stacker plate from said receiving to said delivery position and a generally horizontally extending portion forming a downstream continuation of said arcuate rail portion, said horizontal rail portion having a length corresponding to the thickness of a plurality of said grids, said second rail section comprising a pair of transversely spaced rails pivotably supported on said machine for movement from a generally horizontal position wherein they form a downstream continuation of said horizontal portion of said first rail section to a generally vertical position, a plurality of spaced fingers fixed to the downstream end of said pivoted rails and projecting generally perpendicular thereto and thereabove when the pivoted rails are disposed in said generally horizontally disposed position, said fingers being disposed generally horizontally when said pivoted rails are vertically disposed, means for pivoting the stacker plate from said receiving position to said delivery position in timed relation to the operation of the trim die so that the stacker plate transfers grids one at a time from said trim die onto the horizontal portion of said first rail section whereby, in response to continued operation of said stacker plate, the grids are progressively advanced from the horizontal portion of said first rail section onto the second rail section, a pusher member responsive to the accumulation of a predetermined number of grids on the horizontal portion of said first rail section and on said second rail section for displacing all of said accumulated grids downstream so that the leading grid is positioned adjacent said fingers and the endmost trailing grid is positioned on the second rail section downstream from the downstream end of the horizontal portion of the first rail section and means for pivoting said second rail section from said generally horizontal position to said generally vertical position so that the grids suspended thereon are stacked vertically on said fingers and a conveyor on which said grids are adapted to be deposited in said vertically stacked position, said horizontal portion of said first rail section providing a storage rail for a plurality of grids which enables continued operation of said trim die and stacker plate while the second rail section is being pivoted between said horizontal and vertical positions.

2. The combination set forth in claim 1 wherein said pusher member is mounted on said stacker assembly.

3. The combination set forth in claim 1 wherein the means operative to pivot the second rail section are responsive to the operation of said pusher member.

4. The combination set forth in claim 1 including means for indexing said conveyor through a predetermined distance and means responsive to movement of said fingers to said generally horizontal position for actuating said conveyor indexing means.

5. The combination set forth in claim 4 wherein said conveyor comprises a plurality of transversely spaced, generally horizontally extending, endless chains for advancing the vertically stacked grids in a generally horizontal direction, said fingers being adapted to pivot downwardly between said chains to deposit the vertically stacked grids on the conveyor.

6. The combination set forth in claim 5 wherein the conveyor is indexed through a distance such that the stacked grids thereon clear the ends of the horizontally disposed fingers to enable pivoting the rail assembly back to said generally horizontal position.

* * * * *